United States Patent
Ricart et al.

(10) Patent No.: US 6,795,835 B2
(45) Date of Patent: Sep. 21, 2004

(54) MIGRATION OF COMPUTER PERSONALIZATION INFORMATION

(75) Inventors: Glenn Ricart, Salt Lake City, UT (US); Sheldon Laube, Los Altos Hills, CA (US); Arno A. Penzias, San Francisco, CA (US); Marc Epstein, Los Gatos, CA (US)

(73) Assignee: Centerbeam, Inc., Santa Clara, CA (US)

( * ) Notice: Subject to any disclaimer, the term of this patent is extended or adjusted under 35 U.S.C. 154(b) by 321 days.

(21) Appl. No.: 09/772,338

(22) Filed: Jan. 29, 2001

(65) Prior Publication Data

US 2002/0103779 A1 Aug. 1, 2002

Related U.S. Application Data

(60) Provisional application No. 60/205,728, filed on May 19, 2000.

(51) Int. Cl.[7] .......................... G06F 17/30; G06F 12/00; G06F 15/177
(52) U.S. Cl. .................. 707/204; 707/203; 709/220
(58) Field of Search ............................ 707/204, 1, 203, 707/9; 711/162, 161, 202, 165; 701/202; 709/220

(56) References Cited

U.S. PATENT DOCUMENTS

| | | | | |
|---|---|---|---|---|
| 5,564,037 A | * | 10/1996 | Lam | 711/161 |
| 5,930,806 A | * | 7/1999 | Taira et al. | 707/204 |
| 6,052,512 A | * | 4/2000 | Peterson et al. | 709/220 |
| 6,370,646 B1 | * | 4/2002 | Goodman et al. | 713/100 |
| 6,405,294 B1 | * | 6/2002 | Hayter | 711/162 |
| 6,442,663 B1 | * | 8/2002 | Sun et al. | 711/202 |
| 6,622,083 B1 | * | 9/2003 | Drury et al. | 701/202 |

OTHER PUBLICATIONS

J-H Jahnke, U.A. Nickel and D. Wagenblapt (1998), A case study in Supporting Schema Evolution of Complex Engineering information Systems.*

Michele Colajanni andd Michele Cermele (1997), Dame: An Environment for Preserving the Efficiency of Data–Parallel Computations on Distributed Systems, pp. 41–55.*

* cited by examiner

Primary Examiner—Safet Metjahic
Assistant Examiner—Merilyn P Nguyen
(74) Attorney, Agent, or Firm—Kaplan & Gilman, LLP

(57) ABSTRACT

A migration tool and methods for migrating computer personalization information from one computer to another when a network is not available, when a network is available but use of the network is undesirable for some reason, and/or when the computer which is the source of the data being migrated has limited or unknown resources to support conventional forms of data migration.

29 Claims, 2 Drawing Sheets

MIGRATION OF COMPUTER PERSONALIZATION INFORMATION

RELATED APPLICATION

This application claims priority to Provisional Application No. 60/205,728 which was filed on May 19, 2000.

BACKGROUND OF THE INVENTION

1. Technical Field

The present invention relates generally to computer personalization information, and, more particularly, to a migration tool and methods for migrating computer personalization information from one computer to another.

2. Related Art

FIG. 1 illustrates a computer 100 having a processor 102, and also having memory such as RAM and ROM memory 104 which is accessible to the processor 102. The computer 100 includes user I/O components 106, such as a keyboard, monitor or other display, mouse, and/or other I/O device(s) intended to let the computer 100 exchange data with a human user. System I/O components 108 on a given computer 100 may include a diskette drive, IOMEGA Zip disk drive, serial port, parallel port, Universal Serial Bus ("USB") port, infrared port, radio frequency ("RF") port, network connection, and/or other I/O device(s) intended to permit data exchanges between the computer 100 and another device.

The computer 100 also has a "disk" 110, which may include one or more magnetic disks or other nonvolatile storage media. The disk 110 will often have space 112 which is not yet allocated for use by file system structures 114 or use by the data that is organized by those structures 114. As discussed below and elsewhere herein, the data on the disk 110 typically includes both generic data 116 and personalization data 118.

Examples of generic information 116 include much operating system software, file system software, peripheral device drivers, application software, and their associated help files, associated graphics or sound files, and so on, although each of these may often also be customized in some manner by the inclusion of some personalization information 118. Generic information 116 may be generic because it is being used by many people, or it may be generic because it is in a form suited for installation or use by an as-yet-unspecified person.

For instance, computer vendors typically install an operating system, a set of business applications, some games, and other software on a machine 100. This may be done before the machine is purchased, or it may be done after purchase by using disk images and/or templates that are also used for many or all of the other machines being configured for other purchasers. In either case, most of the installed software information is not specific to any particular person or any particular computer, in the sense that it is interchangeable with copies of that information installed on other computers. Packaged software is also generic, in the sense that much or all of its behavior has not yet been tailored to a specific person or organization.

By contrast, personalization information 118 includes information that pertains specifically to a given user or specific subset of all users. Examples include: personal information such as a user's name, a licensee/owner's business name, and contact information such as postal or email addresses and telephone numbers; personal preferences of the type typically set through software tools such as "Options", "Preferences", "Customize", or similar menu entries; passwords; user data, such as spreadsheets, presentations, graphics, databases, contact lists, address books, and word processor files created by a particular user or by a business or personal contact of the user; and tailored system configuration data, such as programs to run on starting the system 100, other system settings, Ethernet or IP addresses, licensed software serial numbers or Security IDs, and information of the type found in the config.sys,*.ini, autoexec.bat, and registry files in many Microsoft operating system environments.

Various tools and techniques focused on managing personalization information are conventionally known, including examples such as: tools for editing a registry; tools for preventing transmission of personal information such as a social security number or credit card number; tools for recovering forgotten passwords; and various tools for saving and restoring information from files such as WIN.INI, SYSTEM.INI, CONFIG. SYS, AUTOEXEC.BAT, and the Microsoft Windows Registry.

In particular, tools and techniques for migrating personalization information between computers are known. For instance, as illustrated in FIG. 2, tools and techniques are available for reading personalization data 118 (FIG. 1) from a source computer 200 (FIG. 2), sending it over a network connection to a network server 202, and then sending it from the server 202 over a network connection to a destination computer 204. In a peer-to-peer network, personalization data 118 may similarly be sent over a network connection from the source computer 200 directly to the destination computer 204.

As illustrated in FIG. 3, tools and techniques are also available for transferring personalization data 118 from a source computer 300 to a destination computer 304 when the computers 300, 304 do not necessarily have network connections. Using a system I/O device 108 (FIG. 1) such as a tape drive or diskette drive, the personalization data 118 is sent to an intermediate storage medium 302 by a transport application 306 that runs on the computers 300, 304. Unlike the network transfer scenario, the transport application 306 in this case does not necessarily run on both computers 300, 304 at the same time.

Various types of transport applications 306 exist, such as disk imaging applications 306, migration applications 306, and registry management applications 306. Disk imaging applications 306 read the disk 110 of the source computer 300 and create an image of the disk 110 on the storage 302. The image can then be restored to the source computer 300 after the data on that computer is damaged, for instance. The image can also be copied to the disk of a different computer, such as the destination computer 304. The image often includes personalization data 118. However, disk imaging applications 306 do not normally distinguish between generic data 116 and personalization data 118, although users may be able to specify which partitions or files are imaged or restored from an image.

Migration applications 306 are specifically designed to transfer application programs, system settings, application settings, data files, and applications between machines. However, other types of personalization data 118 are not necessarily identified, much less transferred. Conventional migration applications 306 also run on the source and destination computers, and use either a network connection or unassisted intermediate storage 302 to transfer the data 118. Thus, resource and security constraints are imposed.

Registry management applications 306 likewise permit one to transfer specified application programs and their associated information from one computer 300 to another computer 304. The associated information includes information kept in the registry on Microsoft Windows systems. Registry information is an example of personalization data 118. However, registry management applications 306 do not necessarily identify personalization data 118 that is not needed to transfer an application program between computers. Moreover, registry management applications 306 run on the source 300 and destination 304 computers, using the underlying operating system and file system of the computers 300, 304

In view of the foregoing, there is a need in the art for a migration tool and methods for migrating computer personalization information from one computer to another when a network is not available, when a network is available but use of the network is undesirable for some reason, and/or when the computer which is the source of the data being migrated has limited or unknown resources to support conventional forms of data migration.

SUMMARY OF THE INVENTION

The present invention addresses the problem of migrating personalization information from one computer to another. More particularly, the invention addresses migration of personalization data when a network is not available, when a network is available but use of the network is undesirable for some reason, and/or when the computer which is the source of the data being migrated has limited or unknown resources to support conventional forms of data migration.

In a first aspect of the invention is provided a method for migrating personalization data from a source computer to a destination computer, comprising the steps of connecting to the source computer a migration tool having a processor, memory, and means for identifying personalization data; copying personalization data from the source computer to the migration tool using a minimal file system on the source computer and without using a network; connecting the migration tool to the destination computer; and transferring personalization data from the migration tool to the destination computer using a minimal file system on the destination computer and without using a network.

In a second aspect of the invention is provided a migration tool comprising a memory in operable communication with a processor, a means for exchanging information with another computer, and a means of using the memory and processor for identifying personalization data.

In a third aspect of the invention is provided a signal set embodied in a computer, the signal set comprising the combination of a command to read data, personalization data read in response to the command, and minimal migration file system software used to read the personalization data from a source computer disk.

A fourth aspect of the invention provides a method comprising the steps of connecting a migration tool to a source computer, requesting information from the source computer, analyzing the information received, identifying personalization information to be retrieved, and retrieving at least a portion of the identified personalization information.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

Figure 1:
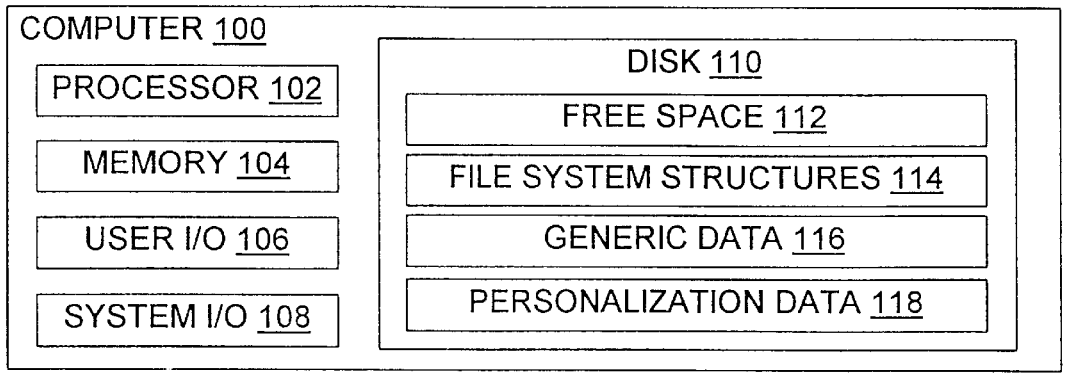
FIG. 1 shows a prior art computer.
Figure 4:
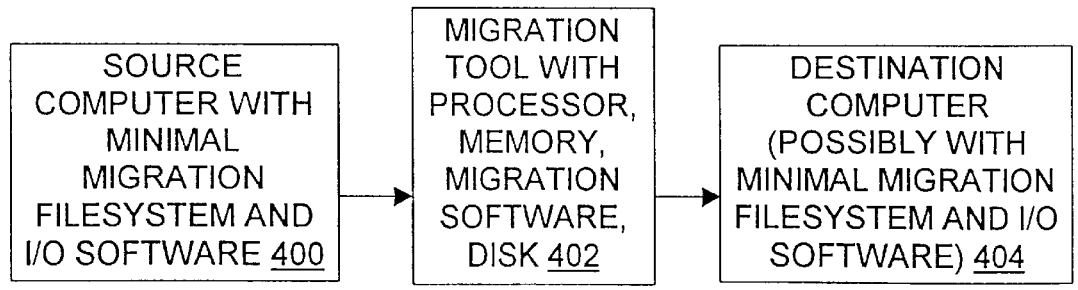
FIG. 4 shows a migration tool and environment for migrating personalization information from one computer to another in accordance with the present invention.

Referring to FIG. 4, the present invention relates to methods, articles, signals, and systems for migrating personalization information 118 from one computer to another. A conventional source computer such as the computer 100 (FIG. 1) is reconfigured with inventive minimal software to become a novel source computer 400 that can access files, disk sectors, the registry, or other places personalization information 118 is stored and do so on behalf of an intelligent external migration tool 402. The reconfiguration may be accomplished in various ways, such as (a) running a small inventive program that has access to places where the personalization information 118 may be stored and can transfer it on request to the external migration tool 402; (b) convincing software already present on source computer 400 to retrieve personalization information 118 and present it on request to the external migration tool 402 (such software may or may not have been designed for that purpose); (c) booting from a diskette that is configured with inventive software capable of retrieving personalization information 118 and presenting it to the external migration tool 402 upon request; and/or (d) overriding the normal boot process to avoid loading a normally used file system and operating system of the computer 100 and running instead inventive minimal migration software capable of retrieving personalization information 118 and presenting it to the external migration tool 402.

The migration of information is not controlled entirely by the software and systems just described on reconfigured computer 400. Instead, an intelligent external migration tool 402 uses reconfigured computer 400 as if it were a peripheral or access device. In one embodiment, the external migration tool 402 executes a four-part process, which is described below, to retrieve personalization information 118 from computer 400.

This process allows the intelligent external migration tool 402 to retrieve personalization information 118 from reconfigured computer 400 with little or no assistance from software previously contained on computer 400. Among advantages of this inventive approach are that it allows migration to be accomplished in some cases when it would otherwise not be possible because: (a) there is no easy way to load a transport application 306; (b) there is no common storage medium 302 configured; (c) there is no network connection on the source computer; (d) the file system or operating system normally deny access to some or all the personalization information 118; (e) software on the source computer is corrupted or inoperable; (f) the selection of appropriate personalization information 118 is beyond the capabilities of the processor 102 or the memory 104 of the source computer; and/or (g) the source computer doesn't know which of its files, configuration information, keys, and other data are unique to it (personalization information 118) and which are generic data 116, because it can't easily compare its information to data found in other systems.

Migration Process

In a first step, the migration tool 402 is connected to the source computer through a port or other means. During this step, the source computer 400 either begins running a small migration program (possibly loaded from diskette) which will respond to the migration tool 402, or, it is rebooted from a migration diskette or over a USB port or other port. In either case, the source computer 400 runs the minimal file system and I/O software described here, rather than the normal operating system and file system software of the source computer 100. Thus, the source computer 400 is prepared to respond to migration tool 402 over one of its ports or via a diskette.

In a second step, the external migration tool 402 requests information from reconfigured computer 400 to determine the type of computer it is, its configuration, and information about locations in which personalization information 118 may be stored. To do so, external migration tool 402 may ask reconfigured computer 400 to read directories, read file names, and/or read files, using BIOS or similar sector I/O routines of the computer 400. It may also read the boot sector, partition table, and similar system data on the source disk 110 to determine what type of file system (e.g., FAT-12, FAT-16, FAT-32, HPFS, Linux, etc.) is present; in other embodiments the migration file system software simply assumes a particular file system is used on the disk 110. In some embodiments the reconfigured computer 400 loaded in the first step a minimal migration access program which uses normal operating system calls to access disk storage, registry entries, and/or other locations where personalization information 118 may be present.

The reconfigured software on computer 400 may be directed by intelligent migration tool 402 to execute commands, e.g., "read root directory and send me the files and/or subdirectories it lists", "read file named X and send me the contents", "write this data to location Y on disk". Commands may be sent to the migration file system software over a system I/O link using a serial port, parallel port, USB port, infrared port, SCSI bus, ATA bus, RF port, RFC 1394 ("firewire") port, or similar port. The migration tool 402 may likewise receive responsive status codes and/or data using such communication means. If the computer 100 has a network port, that port could also be used by disconnecting the computer 100 from the network and connecting it directly to the migration tool 402; note that the network itself is not used but the port and some of the wiring could be used. In addition or as an alternative to using a port, the commands, status codes, and/or data could be transferred using a designated buffer space on a diskette.

In a third step, the external migration tool 402 analyzes the information received and determines the set of personalization information 118 to be retrieved, its location, and the method(s) of retrieving it. In some embodiments, the external migration tool 402 is able to consult lists of known generic files and/or information about them such as their sizes, dates, and/or checksums to eliminate them from the possible set of data that constitutes personalization information 118. In some embodiments, the external migration tool 402 is able to consider the directories, folders, file names, or registry keys under which information is stored to help determine which data is personalization information 118. In some embodiments, the external migration tool 402 is able to look for files or other information created by specific user-ids, associated with certain applications, having certain file name extensions, created or modified at certain times, containing certain strings or keys or codes, having specified metadata, identified by human analysis, processed by certain computers or networks, and/or other identifying characteristics which identify it as possible personalization information 118. In some embodiments, external migration tool 402 is able to consider information it found on other computers 400, which it has previously examined. Information found on other computers 400 may be used to distinguish between generic data 116 and personalization information 118 and/or to determine whether the same or similar personalization information 118 has already been retrieved from a previous computer 400.

In some embodiments, the tool 402 uses one or more of the following: tools and techniques that are also used by conventional transport applications 306 to identify personalization data 118 corresponding to application programs; rules that are also used by conventional anti-virus or similar data protection programs to identify critical data to be protected; rules that are used by security modules to detect the security ID, registration number, and/or address of a particular program and/or machine; heuristics for identifying personal information such as social security numbers and credit card numbers; and/or naming conventions, embedded identifiers, and other criteria for identifying word processor documents, spreadsheets, and other files created by a user.

In a fourth step, the external migration tool 402 retrieves the desired personalization information 118 from reconfigured computer 400. Using similar techniques to those available to the second step, the external migration tool 402 may command the source computer 400 to retrieve personalization information 118 in any of the many possible ways described above under the second step and to present it to the migration tool 402 over a port, by a disk, or using another communication means.

After any non-zero number of executions of these steps one through four on various source computers 400, the external migration tool may be directed in a fifth step to use the personalization information 118 it has collected by doing one or more of the following:

(a) Downloading the personalization information 118 to a destination computer 404. A destination computer 404 is connected to the migration tool 402, and the personalization data 118 is copied or merged into the destination computer 404. A destination computer may be able to perform network transfers with the migration tool 402 or it may receive the personalization information 118 using minimal software and one of its ports or other communication means. In the latter case, the commands may include commands from the tool 402 to the migration software on the destination computer 404 to write personalization data 118 into files and/or sectors on the destination disk 110. In some cases, the data 118 will overwrite current data 118 on the destination disk 110, as when the destination is fresh from the vendor, or has just been the target of a generic disk image restore, so default settings are overwritten, for instance. In some cases the personalization data 118 will be merged into existing destination data 118, as when registry entries are modified. In some cases the data 118 will be new in the sense that no corresponding data 118 was previously on the destination 404, as when user-created files are transferred from the source 400. This step may be completely automated, or a user or administrator who is performing the data 118 migration may be required to specify which data 118 to transfer. This step optionally includes validation efforts to identify and avoid possible inconsistencies that would result from copying data 118 to the destination 404. Such validation efforts may be modeled on conventional migration applications 306. More generally, this step may draw on known migration tools and techniques, with suitable modifications according to the present invention, such as running most of the code on the migration tool 402 instead of running it on the source and/or destination computers.

(b) Archiving or otherwise storing the personalization information 118 so that it can be later restored to a new or repaired source computer 400 (or its replacement or clone) when an original source computer 400 has failed or lost its personalization data.

(c) Analyzing the personalization information 118 for computer viruses or to detect other anomalies, using familiar tools and techniques. Alternatively, or in addition, the personalization information 118 may be analyzed for statistical purposes, again using known tools and techniques in the present inventive context.

(d) Cloning or otherwise using personalization information 118 in order to create duplicate machines.

(e) Modifying or otherwise updating personalization information 118 as it is restored to multiple machines. This may be done, for example, by changing a serial number or a security ID.

(f) Retaining or storing the personalization information 118 as a baseline for later comparison to detect corrupted or changed personalization information.

(g) Assessing the data 118 to determine whether the source computer 400 should be upgraded and/or whether additional storage should be added.

(h) Archiving, storing, or otherwise preserving the personalization information 118 for posterity (such as for museum use, or for use by the National Records Administration).

(i) Saving personalization information 118 for legal or forensic discovery.

(j) Compressing and/or encrypting personalization data 118 prior to performing any of the preceding steps.

(k) Converting the personalization data 118 to a different version or format prior to performing any of the preceding steps. For instance, directory locations may be changed. Similarly, user file formats may be converted, particularly if the source computer 400 and the destination computer 404 (or the other closing or archival destination of the data 118) make use of different versions of a word processor or another application program with which the user files are accessed. Conventional techniques for format conversion may be used, but with the invention they can run on the migration tool 402 instead of running on a source computer or a destination computer.

(l) If, in addition to transferring the information 118 to migration tool 402, the information is also erased from source computer 400 as or after it is transferred, then the effect is to remove personal information 118 from computer 400 so that the source computer 400 can then be reused, reallocated, or discarded without revealing the private personalized information 118 it originally contained.

Additional Comments

The minimal migration software loaded on source computer 400 differs from transport applications 306 in that it contains little or no intelligence about what to migrate; instead it is a slave responding to the external migration tool 402. The minimal migration software loaded on source computer 400 differs from at least some transport applications 306, in that the migration software does not necessarily use the file system software or operating system software (except possibly BIOS routines) of the computer 100. When implemented in this way, it allows the invention to migrate personalization data 118 despite the presence of security modules, anti-virus modules, registry access control software, and other data access constraints or barriers that may be present on a given computer 100 during its normal operation.

The migration software differs from registry management applications 306, which do not necessarily identify the desired personalization data 118. The migration software goes beyond the Windows registry, DLL libraries, and *.INI files, by seeking out and identifying data that includes other personalization information 118 of the type(s) noted herein.

Figure 2:
FIG. 2 shows a prior art network environment in which personalization data is transferred from one computer to another.

The migration software also differs from transport applications 306 which rely on a network connection to transfer personalization data 118, as illustrated in FIG. 2, in that the migration software does not use a network to transfer data 118. This allows the invention to migrate personalization data 118 despite the presence of network security constraints, bandwidth limitations, protocol requirements, network interface hardware requirements, network address requirements, and other complexities of network usage. It also allows the invention to migrate personalization data 118 when the source computer is not networked.

Figure 3:
FIG. 3 shows a prior art data transfer scenario in which an intermediate storage medium is used and the computers do not necessarily have network connections.

The migration software also differs from transport applications 306 which rely on transferring personalization data 118 to a simple storage medium, as illustrated in FIG. 3, in that the migration tool 402 has a processor and memory in addition to a storage medium. The processor and memory are configured to perform at least the steps of identifying and copying personalization data 118 as discussed herein. Use of a separate memory and processor outside the source computer permits much of the migration software to reside on, and to run on, the migration tool 402 instead of on the source computer. This in turn allows the invention to avoid undesired interactions with the standard operating system and/or file system software. It also allows the invention to migrate personalization data 118 when the source computer disk 110 lacks enough free space 112 to hold a transport application 306 or to hold the migration software.

Minimizing the migration code that runs on the source computer 400 also allows the invention to migrate personalization data 118 when the source computer processor 102 is of a different type than the type expected by the migration software on the tool 402. For instance, the source computer processor 102 might be in the Motorola family of processors, while the migration tool 402 processor is in the Intel family. Similarly, the migration tool 402 processor might be a special purpose processor which is tailored for personalization data 118 migration at the microcode or silicon level, such as a processor using application specific integrated circuits ("ASICs") or field programmable gate arrays ("FPGAs").

Figure 5:
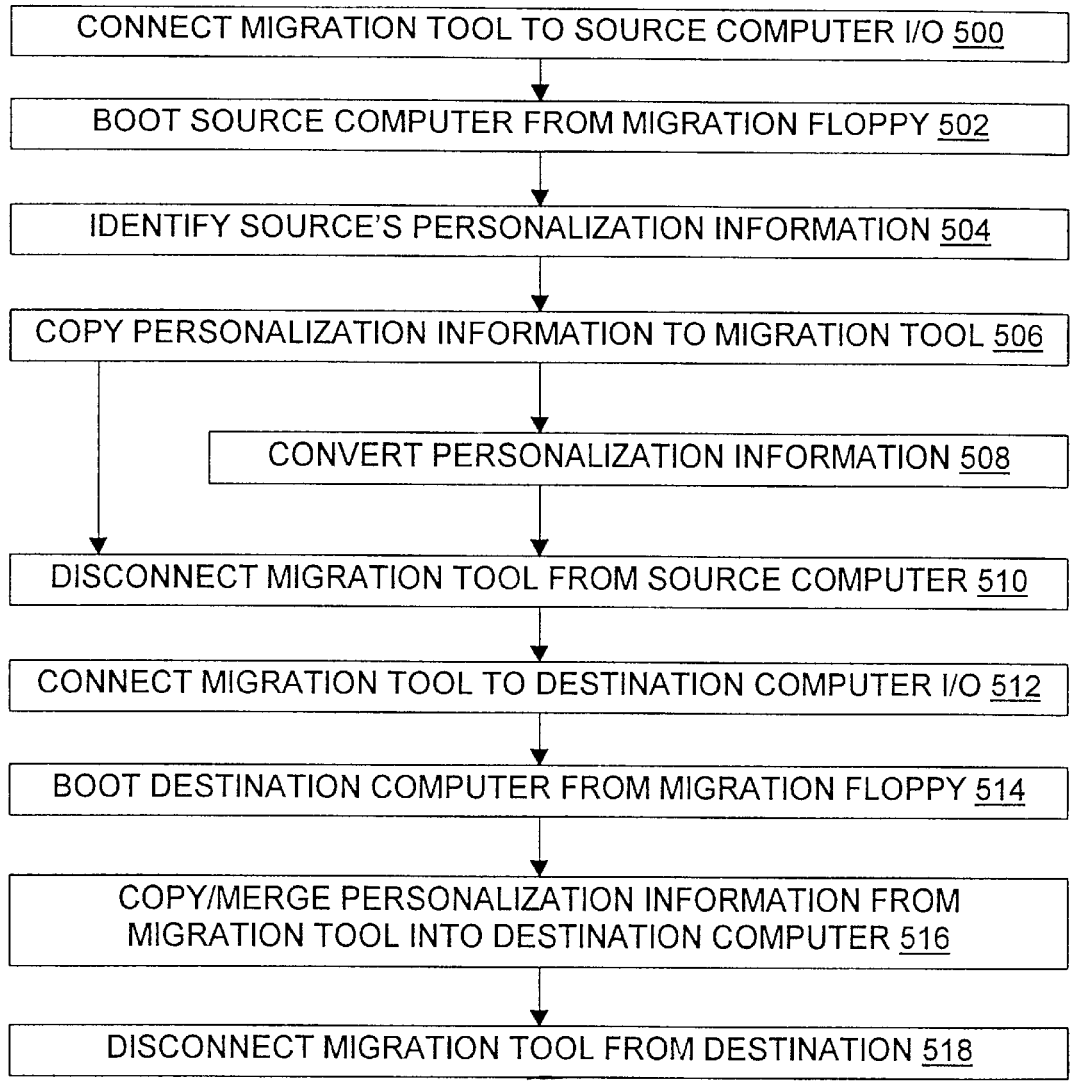
FIG. 5 shows a flowchart of selected embodiments of the present invention.

Referring to FIG. 5, selected embodiments of the invention are further illustrated by the flowchart shown. The invention also includes methods and/or method steps, systems, signals, configured media, and other embodiments which are described in the text of this application but not shown (or only partially shown) in FIG. 5. During a connecting step 500, the migration tool 402 is connected to the source computer through a port or other means as described above. During step 502, the source computer either begins running a small migration program which will respond to the migration tool, or is rebooted from a migration diskette or over a USB port or other port, so that the source computer 400 is running the minimal file system and I/O software as described above, rather than the normal operating system and file system software of the source computer 100.

During an identifying step 504, the migration tool 402 identifies personalization data 118 on the source computer 400. This may be accomplished by reading directory contents and/or file contents from the source computer disk 110, sending them over the port or other link to the tool 402, and analyzing them on the tool 402 using any one or more of various guidelines or criteria. In particular, and without limitation, the tool 402 may use: tools and techniques that are also used by conventional transport applications 306 to identify personalization data 118 corresponding to application programs; rules that are also used by conventional anti-virus or similar data protection programs to identify critical data to be protected; rules that are used by security modules to detect the security ID, registration number, and/or address of a particular program and/or machine; heuristics for identifying personal information such as social security numbers and credit card numbers; and/or naming conventions, embedded identifiers, and other criteria for identifying word processor documents, spreadsheets, and other files created by a user. Some or all of the identified personalization data 118 is copied 506 over the link to the disk on the migration tool 402.

During an optional converting step 508, some of the personalization data 118 is converted to a different version or format. For instance, directory locations may be changed if the source computer 400 uses a different operating system version than the destination computer 404. Similarly, user file formats may be converted if the source computer 400 and the destination computer 404 use different versions of a word processor or another application program with which the user files are accessed. Conventional techniques for conversion may be used, with the understanding that they are implemented to run on the migration tool 402 instead of running on a source computer or a destination computer.

The migration tool 402 is disconnected 510 from the source computer 400 and connected 512 to the destination computer. The destination computer is booted from a migration diskette or otherwise configured to run the minimal migration file system and I/O software. The selected personalization data 118 is then copied over the link to the destination computer 404. In some cases, the data 118 will overwrite current data 118 on the destination disk 110, as when the destination is fresh from the vendor, or has just been the target of a generic disk image restore, so default settings are overwritten, for instance. In some cases the personalization data 118 will be merged into existing destination data 118, as when registry entries are modified. In some cases the data 118 will be new in the sense that no corresponding data 118 was previously on the destination 404, as when user-created files are transferred from the source 400. The step 516 may be completely automated, or a user or administrator who is performing the data 118 migration may be required to specify which data 118 to transfer.

The step 516 preferably includes validation efforts to identify and avoid possible inconsistencies that would result from copying data 118 to the destination 404. Such validation efforts may be modeled on conventional migration applications 306. More generally, the step 516 may draw on known migration tools and techniques, with suitable modifications according to the present invention, such as running most of the code on the migration tool 402 instead of running it on the source and destination, and avoiding use of a network to transfer data.

Finally, the tool 402 is disconnected 518 from the destination 404 and the destination 404 is rebooted to use its normal operating system and file system software.

Although a specific sequence of steps is shown in FIG. 5 and/or discussed in the text, it will be appreciated that steps may be reordered, performed concurrently, omitted, repeated, grouped differently, and/or renamed, in various embodiments of the invention. For instance, steps 500 and 502 could be performed in the reverse order, or they could overlap in execution. Steps 504 and 506 could be repeated some number of times before step 510. Step 510 might not be performed until some time after step 512 begins. Steps 512 and 514 could be performed in the reverse order, or they could overlap in execution. Moreover, any one or more of the steps grouped above for convenience under the optional "fifth step" (namely, downloading, storing, analyzing, cloning, updating, retaining, assessing, preserving, saving, compressing, encrypting, converting, erasing) could be performed at various points. It will be apparent that other variations are also possible.

The inventive migration software or a portion thereof may be embodied in a configured storage medium. Suitable configured storage media include magnetic, optical, or other computer-readable storage devices having specific physical substrate configurations. Suitable storage devices include diskettes, Iomega Zip disks, hard disks, tapes, CDROMs, PROMs, RAM, and other computer system storage devices. The substrate configuration represents data and instructions which cause the computer 400, 402, and/or 404 to operate in a specific and predefined manner as described herein. Thus, in some cases the medium tangibly embodies a program, functions, and/or instructions that are executable by a source computer 400 and/or destination computer 404 to perform file and port I/O steps of the present invention substantially as described herein. In other cases the medium tangibly embodies a program, functions, and/or instructions that are executable by a migration tool 402 to perform port I/O, data 118 identification, and other steps of the present invention substantially as described herein.

Although particular systems and methods embodying the present invention are expressly illustrated and/or textually described herein, it will be appreciated that apparatus, signal, and article embodiments may also be formed according the present invention. Unless otherwise expressly indicated, the discussion herein of any type of embodiment of the present invention therefore extends to other types of embodiments in a manner understood by those of skill in the art.

The invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for migrating, without using a network, personalization data from a source computer having the personalization data and generic data to a destination computer, comprising the steps of:

connecting to the source computer a migration tool having a processor, memory, and means for identifying said personalization data by distinguishing between said personalization data and said generic data;

copying said personalization data from the source computer to the migration tool using a minimal file system on the source computer;

disconnecting the migration tool from the source computer;

connecting the migration tool to the destination computer; and transferring said personalization data from the migration tool to the destination computer using a minimal file system on the destination computer.

2. A storage medium for saving data, wherein it is configured for embodying data and instructions readable by a computer to perform the method of claim 1.

3. A migration tool comprising a processor and a memory in operable communication with the processor, a means for exchanging information with a computer having generic data and personalization data, and a means of using the memory and processor for identifying said personalization data by distinguishing between said personalization data and said generic data.

4. A signal set embodied in a computer having generic data and personalization data, the signal set comprising the combination of a command to read data, and minimal migration software used to read the personalization data from a source computer disk in response to the command by running only a minimal file system and I/O software rather than a normal operating system and file system software.

5. A method comprising the steps of connecting to a source computer having generic data and personalization data a migration tool having a processor, a memory and means for identifying said personalization data so as to distinguish said personalization data from said generic data, requesting information from the source computer related to types and locations of data, analyzing the information received, identifying said personalization information by distinguishing between said personalization data and said generic data, and retrieving at least a portion of the identified personalization information.

6. The method of claim 5, further comprising at least one of the following steps:

downloading the personalization information to a destination computer;

storing the personalization information to permit it to be restored later after loss of another copy of the personalization information;

analyzing the personalization information for computer viruses;

statistically analyzing the personalization information;

cloning the personalization information while creating a duplicate machine;

updating the personalization information;

retaining the personalization information as part of a baseline for later comparisons;

assessing the personalization information to help determine whether the source computer should be upgraded;

preserving the personalization information for posterity in a historical institution;

saving the personalization information for use in legal proceedings;

compressing the personalization information;

encrypting the personalization information; converting the personalization information from one file format or version to another; and erasing the personalization information from the source computer.

7. A system for migrating, without using a network, personalization data from a source computer having generic data and the personalization data to a destination computer, the system comprising:

means for connecting to the source computer a migration tool having a processor, memory, and means for identifying said personalization data by distinguishing between said personalization data and said generic data;

means for copying said personalization data from the source computer to the migration tool using a minimal file system on the source computer;

means for disconnecting the migration tool from the source computer;

means for connecting the migration tool to the destination computer; and means for transferring said personalization data from the migration tool to the destination computer using a minimal file system on the destination computer.

8. A system comprising:

means for connecting to a source computer having generic data and personalization data a migration tool having a processor, a memory and means for identifying said personalization data by distinguishing between said personalization data and said generic data, means for requesting information related to types and locations of data from the source computer, means for analyzing the information received, and means for retrieving at least a portion of the identified personalization information.

9. A method of migrating personalization data from a source computer having generic data and said personalization data, comprising the steps of:

connecting to the source computer a migration tool having a processor, memory, and means for identifying said personalization data by distinguishing between said personalization data and said generic data;

identifying, by means of said migration tool, said personalization data by distinguishing between said personalization data and said generic data;

copying said personalization data from the source computer to the migration tool.

10. The method of claim 9 wherein said step of identifying said personalization data comprises requesting and retrieving by said migration tool from said source computer information for determining types and locations of data in said source computer.

11. The method of claim 10 wherein said step of identifying said personalization data further comprises analyzing said retrieved information to distinguish between said personalization data and said generic data so as to identify said personalization data.

12. The method of claim 11 wherein said step of analyzing comprises comparing said retrieved information with information that said migration tool has obtained from other computers.

13. The method of claim 9 wherein no network is used to connect said migration tool with said source computer.

14. The method of claim 9 further comprising a step of configuring said source computer with minimal migration software which is a slave responding to said migration tool, so that said source computer is running a minimal file system and I/O software rather than a normal operating system and file system software.

15. The method of claim 14 wherein said minimal migration software is capable of retrieving said personalization data and transferring said personalization data on request to said migration tool.

16. The method of claim 15 wherein said step of configuring comprises booting from a diskette that is configured with said minimal migration software.

17. The method of claim 15 wherein said step of configuring comprises overriding a normal boot process to avoid loading said a normally used file system and said operating system of said source computer.

18. The method of claim 14 wherein said step of configuring comprises convincing software already present on said source computer to retrieve said personalization data and to present on request to said migration tool.

19. The method of claim 9 further comprising a step of downloading said copied personalization data from said migration tool to a destination computer.

20. The method of claim 19 further comprising a step of configuring said destination computer with minimal migration software which is a slave responding to said migration tool, so that said destination computer is running a minimal file system and I/O software rather than a normal operating system and file system software.

21. The method of claim 20 wherein said step of downloading comprises the steps of disconnecting said migration tool from said source computer and then connecting said migration tool to said destination computer.

22. The method of claim 21 wherein no network is used to connect said migration tool to said destination computer.

23. The method of claim 21 wherein said migration tool is connected to said destination computer by a network.

24. A data migration kit for migrating personalization data from a source computer having generic data and said personalization data, comprising:

a migration tool having a processor, memory and means for identifying said personalization data by distinguishing between said personalization data and said generic data, and storage for saving said personalization data obtained from said source computer; and a minimal migration software operable on said source computer and capable of, in response to request from said migration tool, retrieving information related to types and locations of data on said source computer and transferring said retrieved information to said migration tool.

25. The data migration kit of claim 24 wherein said minimal migration software is capable of configuring said source computer so that said source computer is running a minimal file system and I/O software rather than a normal operating system and file system software.

26. The data migration kit of claim 25 wherein said minimal migration software is a slave responding to said migration tool.

27. The data migration kit of claim 24 wherein said migration tool is connectable to said source computer without using a network.

28. The data migration kit of claim 24 wherein said migration tool is connectable to a destination computer for downloading said personalization data saved in said storage of said migration tool to said destination computer.

29. The data migration kit of claim 28 wherein said minimal migration software is operable of configuring said destination computer so that said destination computer is running a minimal file system and I/O software rather than a normal operating system and file system software.

* * * * *